United States Patent
Jimenez et al.

(10) Patent No.: US 10,411,441 B2
(45) Date of Patent: Sep. 10, 2019

(54) LOAD CENTERS WITH NEUTRAL BUS BARS FOR BREAKER PLUG-ON NEUTRAL CONNECTIONS

(71) Applicant: Eaton Intelligent Power Limited, Dublin (IE)

(72) Inventors: Sandy Omar Jimenez, Monaca, PA (US); Luis Enrique Betances Sansur, Distrito Nacional (DO)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/883,685

(22) Filed: Jan. 30, 2018

(65) Prior Publication Data
US 2019/0237946 A1    Aug. 1, 2019

(51) Int. Cl.
H02B 1/04    (2006.01)
H02B 1/20    (2006.01)
H02B 1/056   (2006.01)

(52) U.S. Cl.
CPC .............. H02B 1/20 (2013.01); H02B 1/056 (2013.01)

(58) Field of Classification Search
None
See application file for complete search history.

(56) References Cited

U.S. PATENT DOCUMENTS

| | | | |
|---|---|---|---|
| 4,167,769 A * | 9/1979 | Luke ...................... | H02B 1/056 361/637 |
| 4,351,583 A | 9/1982 | Belttary | |
| 4,743,204 A | 5/1988 | Fromm et al. | |
| 4,785,377 A * | 11/1988 | Rhodes .................. | H02B 1/056 361/637 |
| 6,591,482 B1 | 7/2003 | Fleege et al. | |
| 7,449,645 B1 * | 11/2008 | Flegel ...................... | H01R 4/64 200/50.32 |
| 7,957,122 B2 * | 6/2011 | Sharp ...................... | H02B 1/056 174/67 |
| 8,049,126 B2 | 11/2011 | Chen et al. | |
| 9,048,054 B2 | 6/2015 | Potratz | |
| 9,112,336 B2 * | 8/2015 | Samuelson ............ | H02B 1/056 |
| 9,184,525 B1 | 11/2015 | Ranta | |
| 9,627,164 B2 * | 4/2017 | Robinson ............. | H01H 71/002 |
| 9,666,398 B2 | 5/2017 | Robinson et al. | |
| 10,020,152 B2 | 7/2018 | Pearson et al. | |
| 2008/0158788 A1 * | 7/2008 | Darr ....................... | H01H 9/104 361/647 |
| 2008/0289938 A1 | 11/2008 | Raabe et al. | |

(Continued)

OTHER PUBLICATIONS

ABB"SENTRICITY™ Loadcenters and Circuit Breakers: Raising the standard in residential" *Canadian Catalog, Product Brochure* (12 pages) (Aug. 2017).

(Continued)

*Primary Examiner* — Courtney L Smith
(74) *Attorney, Agent, or Firm* — Myers Bigel, P.A.

(57) ABSTRACT

Load centers with neutral bus bars that allow plug-on neutral circuit breakers to couple thereto and can accommodate short body branch circuit breakers with plug-on clips. The neutral bus bars can have a rectangular profile and can have a curvilinear shape to position one long segment of the neutral bus bar, closer to the line connectors than another shorter segment thereof.

20 Claims, 10 Drawing Sheets

(56) References Cited

U.S. PATENT DOCUMENTS

| | | | | |
|---|---|---|---|---|
| 2013/0188297 A1* | 7/2013 | Ranta | ............... | H02B 1/056 |
| | | | | 361/637 |
| 2014/0168862 A1* | 6/2014 | Wheeler | ............ | H02B 1/20 |
| | | | | 361/640 |
| 2017/0309431 A1* | 10/2017 | Hiremath | ............ | H01F 38/20 |

OTHER PUBLICATIONS

Square D "Plug-on Neutral Load Centers with Qwick-Grip Wire Management System" *Product Brochure,* www.schneider-electric.us/qg (8 pages) (2017).

* cited by examiner

LOAD CENTERS WITH NEUTRAL BUS BARS FOR BREAKER PLUG-ON NEUTRAL CONNECTIONS

FIELD OF THE INVENTION

The present disclosure relates to electrical distribution devices.

BACKGROUND OF THE INVENTION

Arc Fault Circuit Interrupters (AFCI) and Ground Fault Circuit Interrupters (GFCI) are among a variety of overcurrent protection devices used for circuit protection and isolation. Arc Fault Circuit Interrupters (AFCIs) reduce fire hazards in electrical circuits by reducing the effects of high current arcing faults (parallel arcs) as well as detecting persistent low-current arcing faults (series arcs). Ground Fault Circuit Interrupters reduce the potential of electrical shock. Dual purpose AFCI/GFCI breakers are available which provide GFCI protection and AFCI protection as combination type breakers from Eaton Corporation. Both branch feeder and combination AFCIs provide conventional thermal and magnetic overcurrent protection. Both also provide high current or "parallel" arcing fault detection and fire mitigation for installed wiring and connected cords.

Load centers and similar electrical distribution devices can be configured with neutral bus bars that allow neutral terminal connections using neutral plug-on clips of circuit breakers.

SUMMARY OF EMBODIMENTS OF THE INVENTION

Embodiments of the invention are directed to load centers that include: a panel; at least one collar assembly coupled to the panel; a plurality of longitudinally spaced apart terminal screws coupled to the panel; at least one neutral bus bar coupled to the panel; a plurality of longitudinally spaced apart line connectors coupled to a medial portion of the panel that are laterally spaced apart from the at least one neutral bus bar; and at least one short body branch circuit breaker with a plug-on neutral clip coupled to one of the at least one neutral bus bar.

The load center of claim 1, wherein the at least one short body branch circuit breaker comprises a housing with a circuit board therein, wherein the housing has a length measured between load and line sides of the housing that is between 2-4 inches, wherein at least a major length of the circuit board resides inside the housing behind and above the plug-on clip, and wherein the plug-on clip extends below and adjacent the outer load side of the housing a laterally spaced apart distance in a range of about 0.1 inches and about 1 inch.

The short body branch circuit breaker can have a housing with opposing line and load sides. The load side of the housing can reside inside and adjacent one of an outer right side of the panel or an outer left side of the panel.

The at least one neutral bus bar can have a curvilinear shape with opposing longitudinally spaced apart first and second end portions. The curvilinear shape can have a curved segment residing between first and second linear segments. The first linear segment can have a greater length than the second linear segment. The second linear segment can reside laterally further away from the line connectors than the second linear segment.

The first linear segment and the second linear segment each have longitudinally extending centerlines. The centerlines can be laterally spaced apart a distance in a range of about 0.4 inches and about 1.25 inches. The second linear segment can reside at a height that is above a bottom surface of the first linear segment.

The at least one neutral bus bar can be provided as right and left side neutral bus bars. The right and left side neutral bus bars can have a rectangular cross-sectional shape with an outer facing free end segment that is perpendicular to the panel and that enters the plug-on neutral clip to couple one of the at least one short body circuit breaker to the right or left side neutral bus bar.

The rectangular cross-sectional shape can have a perimeter with a pair of long sides and a pair of short sides. The long sides can be oriented perpendicular to the panel at a first linear segment of the at least one neutral bus bar and can be oriented parallel to the panel at a longitudinally spaced apart second linear segment of the at least one neutral bus bar. The first linear segment has a greater length than the second linear segment.

The first and second linear segments can be laterally spaced apart, can have straight linear extents and can be parallel to each other.

The plurality of terminal screws can be longitudinally aligned with an adjacent one or more of the at least one of the at least one collar assembly along an outer side portion of a right and/or left side of the panel. The first and second linear segments can be parallel to the aligned terminal screws. The first linear segment can reside closer to the line connectors than the second linear segment.

The load center can further include a plurality of longitudinally spaced apart prongs that are coupled to the panel and that project outwardly therefrom and that hold the first linear segment of the neutral bus bar.

The at least one neutral bus bar can include right side and left side neutral bus bars. The right and left side neutral bus bars can each have a longitudinally extending curvilinear shape with longitudinally opposing first and second end portions. The first end portion of the right side neutral bus bar can reside laterally and longitudinally closer to the line connectors than the second end portion of the right side neutral bus bar. The first end portion of the left side neutral bus bar can reside laterally and longitudinally closer to the line connectors than the second end portion of the left side neutral bar.

Other embodiments are directed to a load center that includes a panel; at least one collar assembly coupled to the panel; a plurality of longitudinally spaced apart terminal screws coupled to the panel; and at least one neutral bus bar coupled to the panel. The at least one neutral bus bar has a curvilinear shape with opposing longitudinally spaced apart first and second end portions. The curvilinear shape has a curved segment residing between first and second linear segments. The first linear segment has a greater length than the second linear segment. The load center also includes a plurality longitudinally spaced apart of line connectors coupled to a medial portion of the panel. The line connectors are laterally spaced apart from the at least one neutral bus bar. The first linear segment of the at least one neutral bus bar resides laterally closer to the line connectors than the second linear segment.

The first linear segment and the second linear segment can each have longitudinally extending centerlines. The second linear segment can reside at a height that is above a bottom surface of the first linear segment. The centerlines can be laterally spaced apart a distance in a range of about 0.4 inches and about 1.25 inches.

The at least one neutral bus bar can include right and left side neutral bus bars. The right and left side neutral bus bars can have a rectangular cross-sectional shape with an outer facing free end segment that is perpendicular to the panel and that enters the plug-on neutral clip to couple one of the at least one short body circuit breaker to the right or left side neutral bus bar.

The rectangular cross-sectional shape can have a perimeter with a pair of long sides and a pair of short sides. The long sides can be oriented perpendicular to the panel at a first linear segment of the at least one neutral bus bar and can be oriented parallel to the panel at a longitudinally spaced apart second linear segment of the at least one neutral bus bar. The first linear segment can have a greater length than the second linear segment.

The first and second linear segments can be laterally spaced apart, can have straight linear extents and can be parallel to each other.

The plurality of terminal screws can be longitudinally aligned with and adjacent one or more of at least one of the at least one collar assembly along an outer side portion of a right and/or left side of the panel. The first and second linear segments can be parallel to the aligned terminal screws. The first linear segment can reside closer to the line connectors than the second linear segment.

The load center can further include a plurality of longitudinally spaced apart prongs that are coupled to the panel and that project outwardly therefrom and couple to the first linear segment of the neutral bus bar.

The at least one neutral bus bar can include right side and left side neutral bus bars. The first end portion of the right side neutral bus bar can reside laterally and longitudinally closer to the line connectors than the second end portion of the right side neutral bus bar. The first end portion of the left side neutral bus bar can reside laterally and longitudinally closer to the line connectors than the second end portion of the left side neutral bar.

The load center can include at least one short body circuit breaker with a plug-on clip coupled to one of the at least one neutral bus bar.

Embodiments of the present invention provide load centers with at least one neutral bus bar having a curvilinear shape with a linear segment that can directly couple to a plug-on neutral clip of a short body circuit breaker.

The neutral bus can have a non-circular (typically polygonal) profile with an outer facing free outer end that projects straight outward, perpendicular to a back panel of the load center.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

DETAILED DESCRIPTION OF EMBODIMENTS OF THE INVENTION

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10'"). The terms "FIG." and "FIG." may be used interchangeably with the word "Figure" as abbreviations thereof in the specification and drawings. In the figures, certain layers, components or features may be exaggerated for clarity, and broken lines illustrate optional features or operations unless specified otherwise.

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Embodiments of the invention are particularly suitable for electrical devices such as load centers or wall panels for electrical devices. The terms "load center" and "electrical distribution load center" refer to the collective components of an electrical distribution system and its respective housing that supplies electrical power to one or more subsidiary circuits. The terms "bus," "bus element," "electrical distribution bus," or "bus bar" refer to components in an electrical distribution system that conduct electricity within the load center.

Electrical load centers include electrical busses that comprise conductors permitting electrical current to be carried throughout the electrical load center. Electrical busses may contain features permitting attachment of fuses, relays, switches, wires, breakers, and other electrical elements. Load centers may contain one or more electrical busses in close proximity to one another, and insulating material or insulation may be used to avoid an arcing or shorting event occurring between the busses. Busses are electrically insulated from each other to avoid a phase-to-phase short circuit. Busses are also electrically insulated from the electrical load center enclosure to avoid a phase-to-ground short circuit. Some load centers also include branch circuit breakers connected to the electrical busses at specific points within the load centers. The location, orientation, and spacing of the bus elements and insulation elements within the load are arranged so as to prevent an arcing, overcurrent, or short circuit event once the busses are placed under load. The load centers typically include an enclosure with a backpan assembly with a backpan holding a bus structure attached to the back of the enclosure. See, e.g., U.S. Pat. No. 9,112,336, the contents of which are hereby incorporated by reference as if recited in full herein.

Figure 1A:
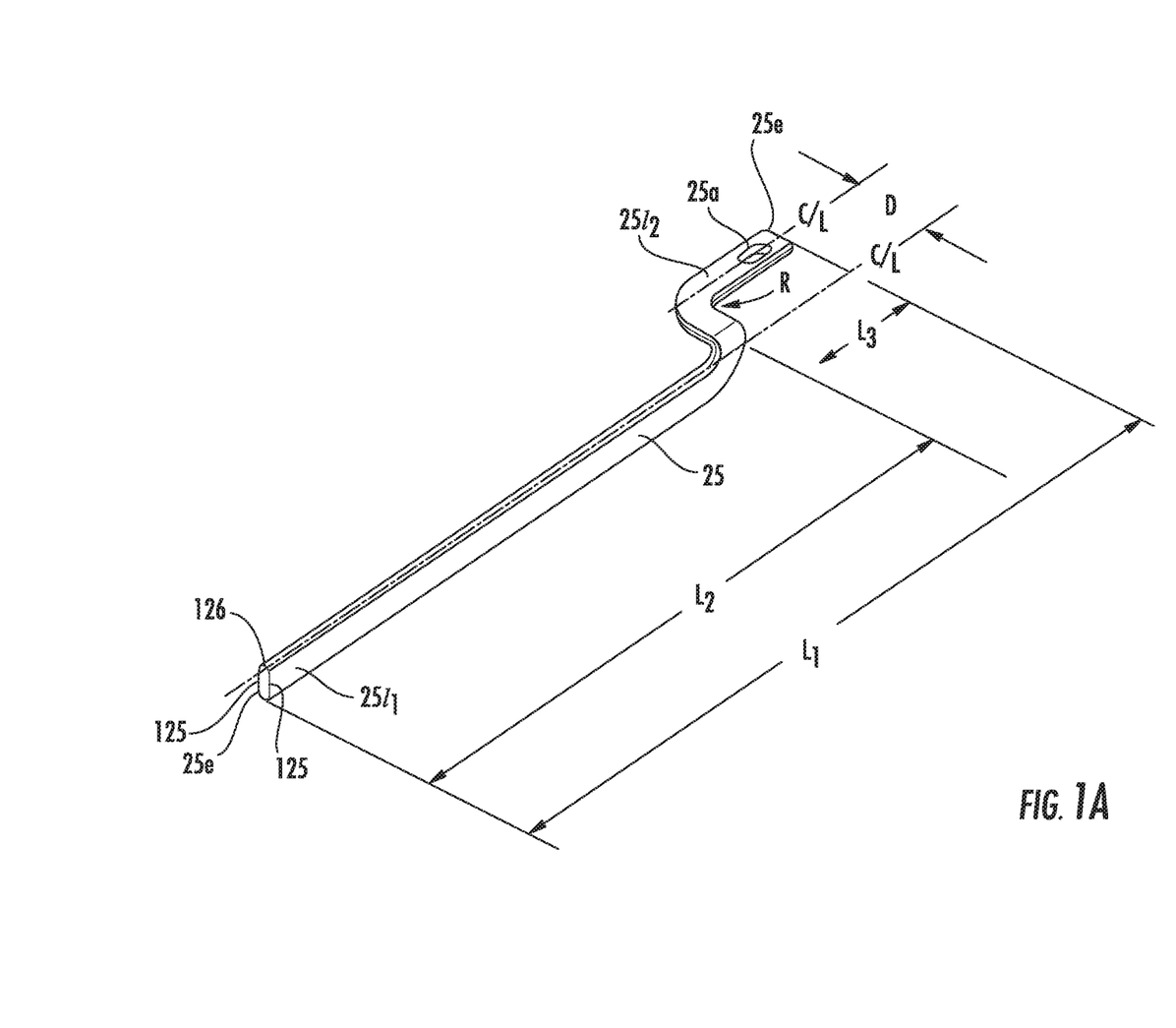
FIG. 1A is a side perspective view of an example neutral bus bar according to embodiments of the present invention.
Figure 2A:
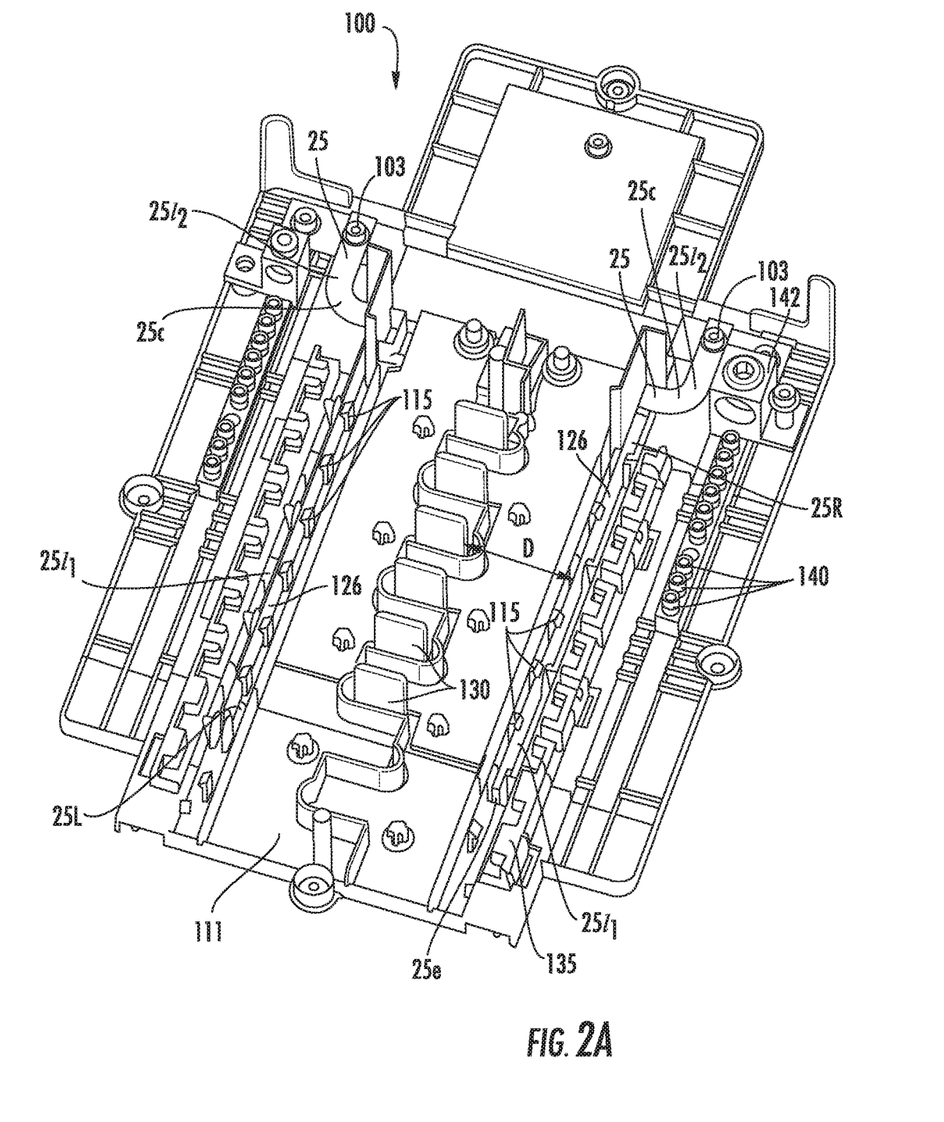
FIG. 2A is a front perspective view of an example load center according to embodiments of the present invention.
Figure 2B:
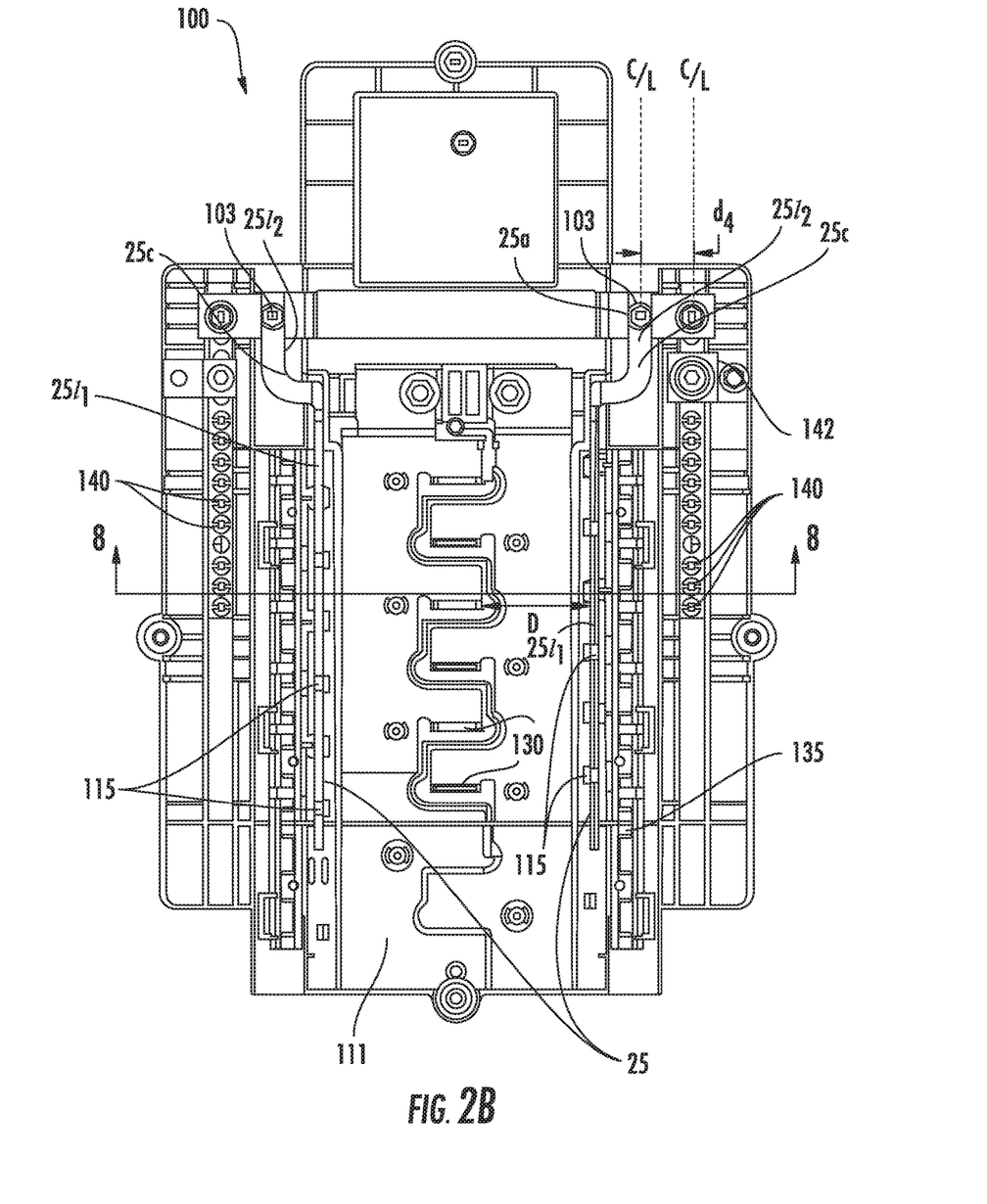
FIG. 2B is a front view of the load center shown in FIG. 2A.

Referring to FIG. 1A, an example neutral bus bar 25 is shown. FIGS. 2A and 2B show the example neutral bus bar 25 held by a wall panel 111 (i.e., wall panel of a backpan assembly) of a load center 100. Typically, the neutral bus bar 25 is provided on each of a right and left side of the wall panel 111 with (line) panel connectors 130 therebetween.

Figure 1B:
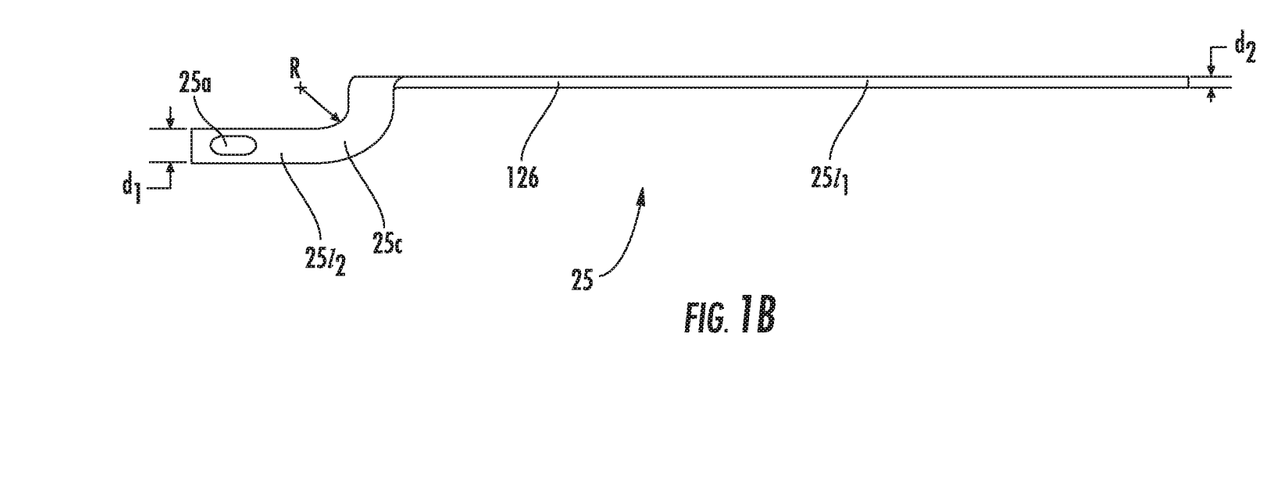
FIG. 1B is a side view of the neutral bus bar shown in FIG. 1A.
Figure 1C:
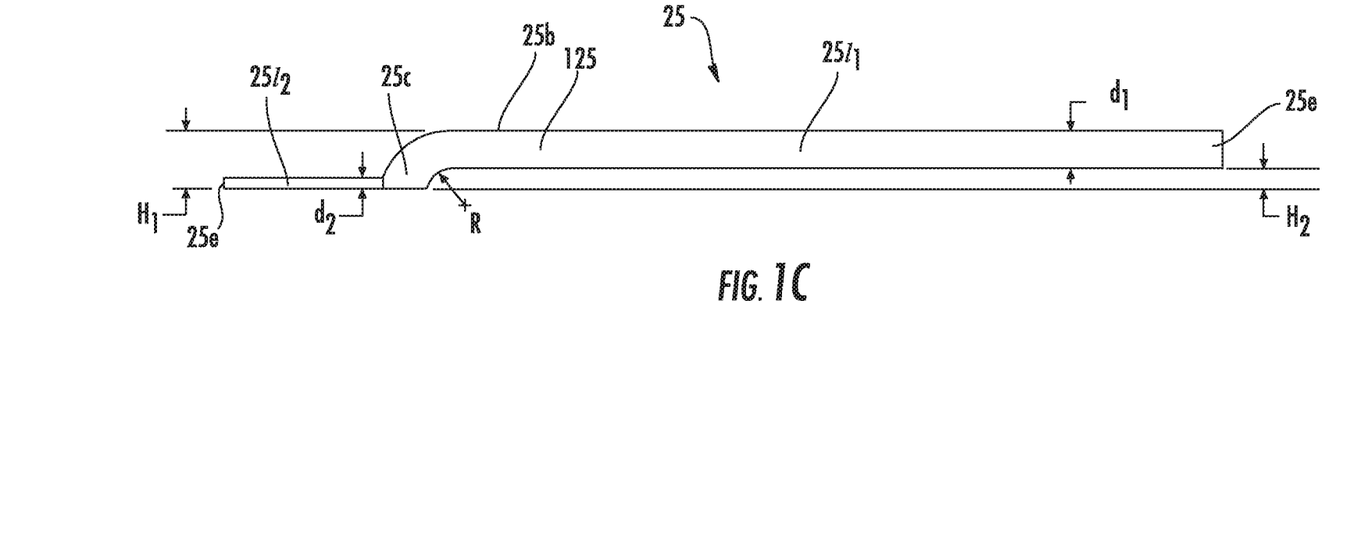
FIG. 1C is a top view of the neutral bus bar shown in FIG. 1A.

Referring to FIGS. 1A-1C, the neutral bus bar 25 can have a curvilinear shape between longitudinally spaced apart and opposing first and second ends 25e. The overall length $L_1$ of the neutral bus bar 25 can depend on the length of the panel 111, typically lengths are in a range of about 12 inches to about 44 inches. The curvilinear shape of the bus bar 25 can have a first linear segment $25l_1$ with a length $L_2$ that merges into a curved segment 25c that merges into a second linear segment $25l_2$ that has a second length $L_3$ that is less than the length $L_2$ of the first linear segment $25l_1$. $L_2$ can be 2-100× greater than $L_3$, more typically 3-10× greater. $L_2$ can be at least 60% of the overall length $L_1$, typically in a range of 60-90% of $L_1$. The first linear segment $25l_1$ can be a straight linear segment that is parallel to the second linear segment $25l_2$. The second linear segment $25l_2$ can also be a straight linear segment and can have a length in a range of 1-2 inches, typically in a range of about 1.2 and about 1.4 inches.

The second linear segment $25l_2$ can have a through aperture 25a which can have an elongate shape (elongate in a length/longitudinal direction) that receives a fixation member 103 (FIG. 2A) to couple the curved segment 25c to a mounting block and/or a neutral crossbar and/or panel 111 of the load center 100.

Referring to FIG. 1A, the aperture 25a can have a longitudinally extending centerline (C/L), which can also be the C/L of the second linear segment $25l_2$, that is laterally offset a distance D from a longitudinally extending centerline of the first linear segment $25l_1$. In some embodiments, the distance D can be in a range of 0.25 inches and 2 inches, more typically in a range of 0.4 inches and 1.25 inches, including, for example, about 0.5 inches, about 0.6 inches, about 0.7 inches, about 0.8 inches, and about 0.9 inches.

Referring to FIGS. 1A-1C, the curved segment 25c can have a radius of curvature R that is in a range of 0.1 inches and 0.5 inches, more typically about 0.25 inches.

Referring to FIG. 1C, the second linear segment $25l_2$ can reside at a height $H_1$ above a lower end (i.e., bottom) 25b of the first linear segment $25l_1$. In some embodiments, the height $H_1$ can be in a range of about 0.2 inches and 1.25 inches, more typically in a range of about 0.4 inches and about 0.7 inches, such as about 0.6 inches, in some particular embodiments. The second linear segment $25l_2$ can reside at a height $H_2$ above an upper end of the first linear segment $25l_1$ and $H_1 > H_2$. The height $H_2$ can be in a range of about 0.1 inches and about 0.3 inches, more typically about 0.2 inches, in some embodiments.

The first linear segment $25l_1$ can have a rectangular cross-sectional profile or perimeter. Long sides 125 of the rectangular profile can be oriented to be perpendicular to the wall panel 111 while the short sides 126 can be parallel to the wall panel 111 as shown in FIGS. 2A, 5, 7, 8 and 9, for example.

Figure 9:
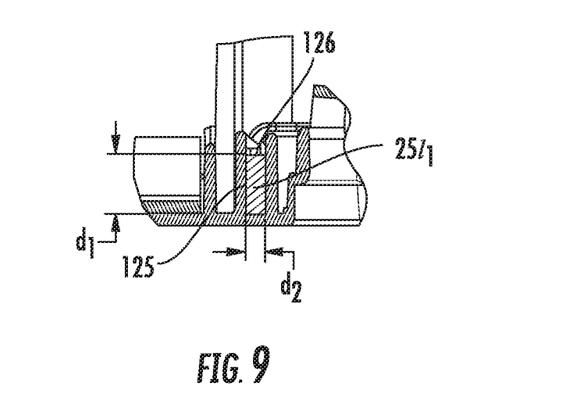
FIG. 9 is an enlarged view of the portion of the load center labeled as detail 9 in FIG. 8 according to embodiments of the present invention.

Referring to FIGS. 1B, 1C and 9, the short sides 126 of the first linear segment $25l_1$ can have a dimension $d_2$ (a lateral extent in an operative orientation as shown in FIG. 9) that is less, typically 50% to 75% less, than a dimension $d_1$ of the long sides 125 (a height extent in the operative orientation as shown in FIG. 9). The long sides 125 can have a height extent $d_1$ that is in a range of 0.3 and 1 inch, more typically in a range of 0.4 inches and 0.5 inches. The short sides 126 can have a dimension $d_2$ that is between 0.1 and 0.2 inches, in some embodiments, such as, for example, about 0.125 inches. Although shown as having a rectangular shape, other shapes may be used, such as other polygonal shapes. The long sides 125 are not required to be parallel to each other and can have different lengths. The short sides 126 can have different lateral extents (not shown) and are not required to be parallel to each other. That is, the short sides 126 can taper in an inward and/or outward direction rather than be planar.

The neutral bus bar 25 can be a rectangular straight single bar that is bent to formed the curvilinear shape with the curved segment 25c and turn the long sides of the second linear segment $25l_2$ to be perpendicular to the orientation of the long sides in the first linear segment $25l_1$. The long sides of the straight bar with dimension $d_1$ can form the long sides/sidewalls 125 of the first linear segment $25l_1$ and the laterally extending upper and lower sides of the second linear segment $25l_2$. Similarly, the short dimension $d_2$ can form the vertical wall segments of the second linear segment $25l_2$. The neutral bus bar 25 can comprise a suitably conductive material such as, but not limited to, Aluminum Alloy 1100-H14 with conductive plating such as, for example, tin plating.

Referring to FIGS. 2A and 2B, the neutral bus bar 25 can place the second linear segment $25l_2$ further away from the line connectors 130 and/or a medial segment of the wall panel 111 (FIGS. 2A, 2B) than the first linear segment $25l_1$ when in an operative position, i.e., the first linear segment $25l_1$ resides laterally closer to the line connectors 130 than the second linear segment $25l_2$ f of the neutral bus bar 25.

Still referring to FIGS. 2A and 2B, the load center 100 can include outwardly projecting non-electrically conductive prongs 115 that can extend over an outer facing end of the short sides 126 of the first linear segment $25l_1$ of the neutral bus bar 25. The prongs 115 can be in-line and longitudinally spaced apart over the first linear segment $25l_1$. The outer ends of the prongs 115 can be able to flex side to side to slidably receive and hold the bus bar in position on the panel 111. The prongs 115 can comprise a thermoplastic polymer with a suitable dielectric strength. The prongs 115 can have a dielectric strength of at least 460 kV/in (at thickness 0.126 inches, ASTM D 149, in oil). The prongs 115 can comprise a Polyphenylene Ether and polystyrene blend (UL 94 V1, UL 746C F1) unfilled, non-brominated and, non-chlorinated FR system, such as Noryl® SE1xPPE+PS from SABIC Innovative Plastics (head quartered in Saudi Arabia).

The neutral bus bar 25 can be located toward the inside of the panel 111 adjacent the line connection 130 of the breaker 10, allowing the possibility of using short body breakers. This is in contrast to known conventional panels that have the neutral bus bar located toward the outside of the panel 111 near the load connection of the breaker which does not allows the use of short body breakers with plug on neutral connection, requiring long body breakers, which are typically greater in overall length by about 25% than short body breakers. Thus, referring to FIGS. 3A and 3B, in some embodiments, the load centers 100 can be configured to releasably engage one or more short body (branch) breakers 10. The term "short body breakers" refers to breakers 10 with housings having a length L measured between the line side 10li and load side 10ld of the housing that can be under 4.25 inches, such as between 2-4 inches. In some embodiments, the length L is about 3.25 inches. Long body breakers have greater lengths measured between the line side 10li and load side 10ld of the housing such as about 4.60 inches and/or can position the plug on neutral clip a much greater distance away from the front corner/load facing side of the housing. The short body branch circuit breakers 10 can position the load facing side 10ld inside an adjacent one of the outer right or left side of the panel 111 (while long body breakers extend outside the wall panel).

In some embodiments, the load center 100 can accommodate short body branch breakers 10 as shown in FIGS. 3A, 3B, 5 and 7, which can have a major portion of a length of the circuit board 75 positioned rearward of the plug-on neutral clip 50. In contrast, long body breakers (see, e.g., U.S. Pat. No. 7,957,122, the content of which is hereby incorporated by reference as if recited in full herein) place the internal circuit board forward of the plug-on clip, closer to an outer edge of the panel.

Figure 5:
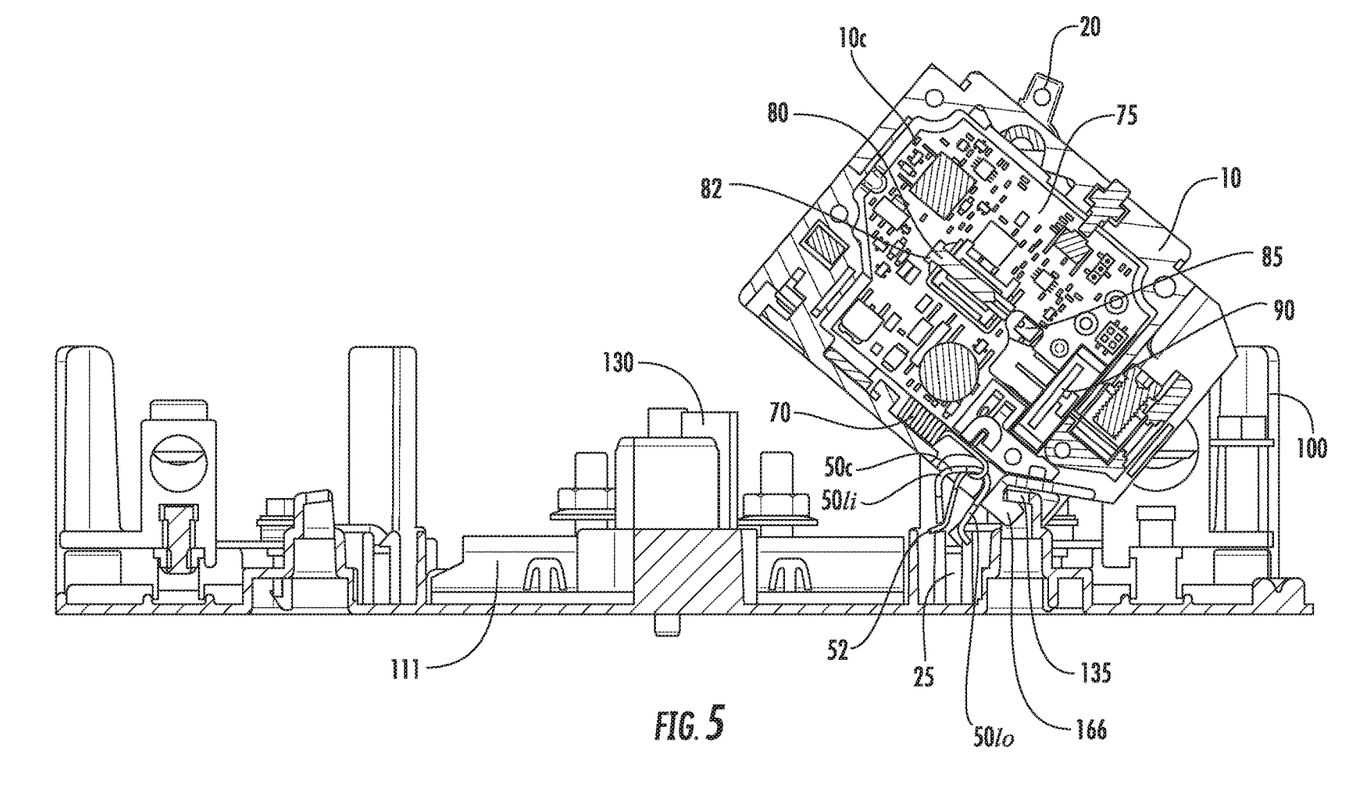
FIG. 5 is a side section view of the circuit breaker in a first position relative to the load center taken along line 5-5 of FIG. 4 (pre-installed or improperly installed) according to embodiments of the present invention.
Figure 6:
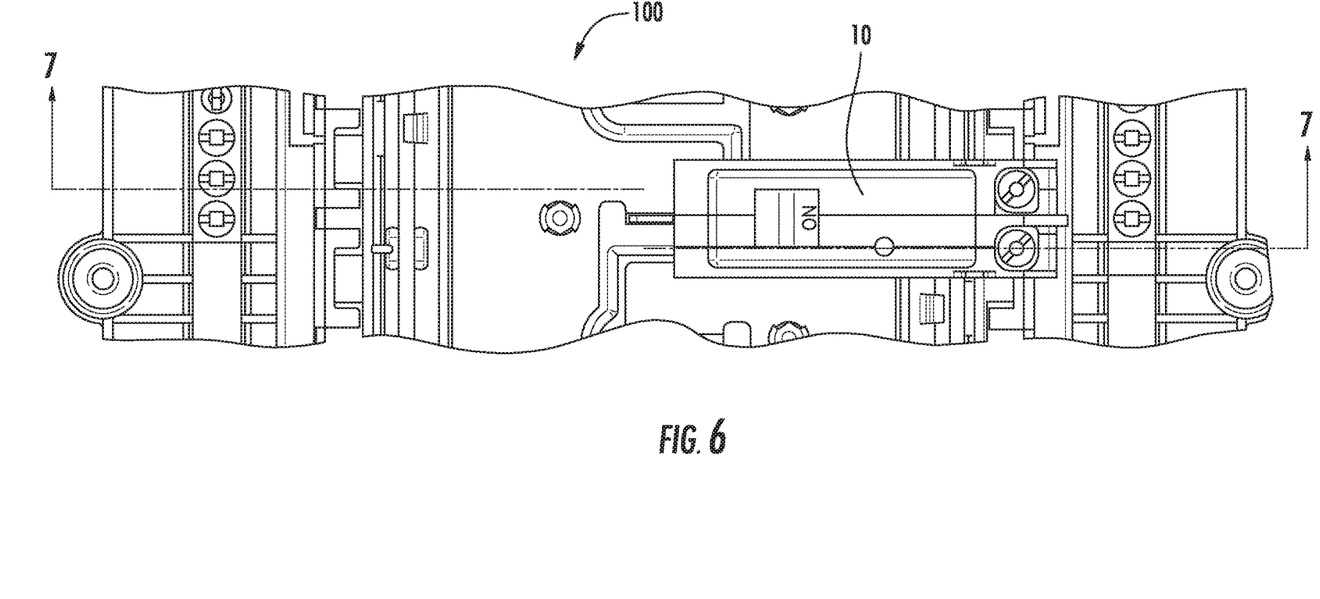
FIG. 6 is a partial view of the circuit breaker of FIG. 3A in a second position relative to the load center (properly coupled to the neutral bus bar of the load center of FIG. 2A) according to embodiments of the present invention.
Figure 7:
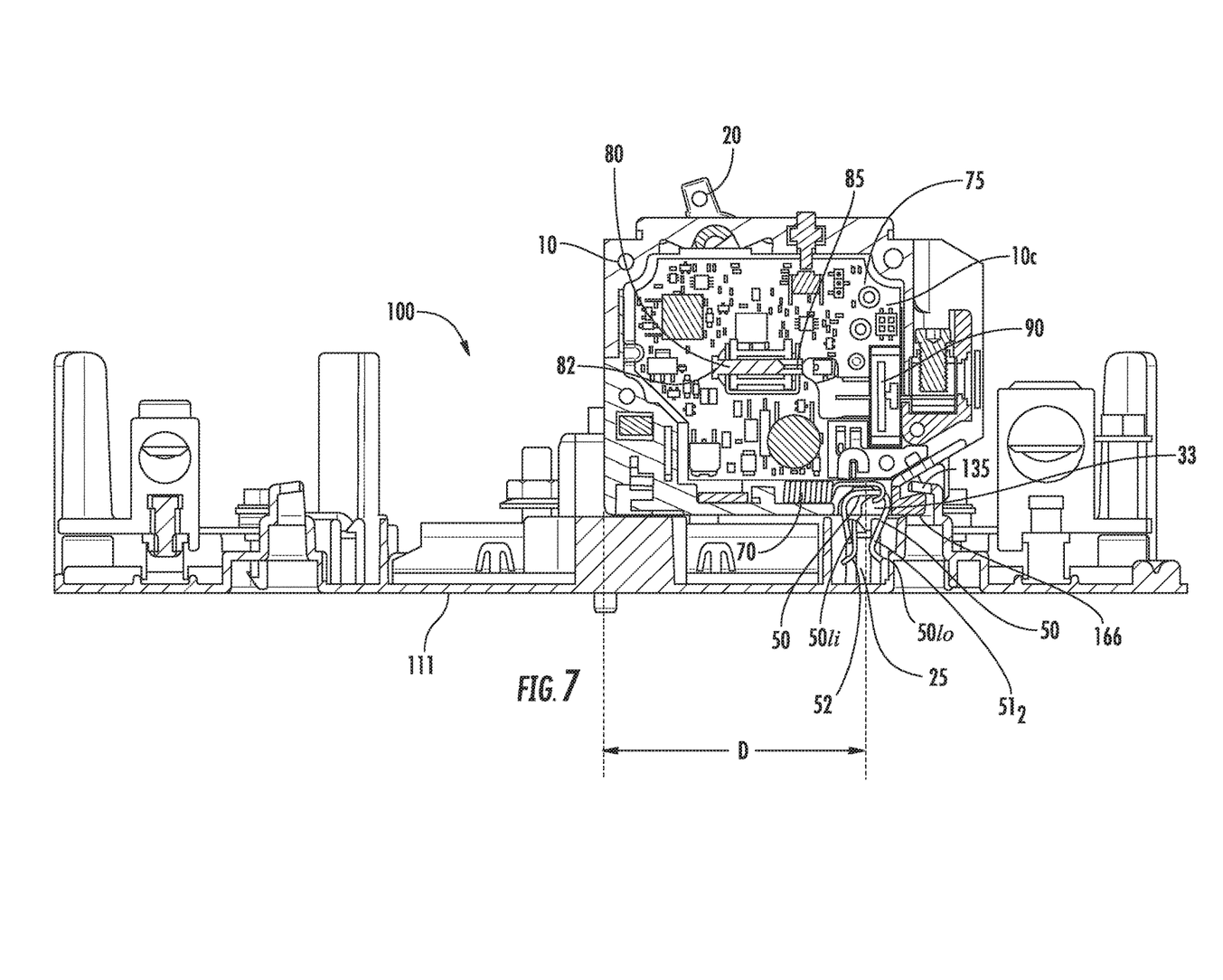
FIG. 7 is a side section view of the circuit breaker and load center taken along line 7-7 of FIG. 6 according to embodiments of the present invention.
Figure 8:
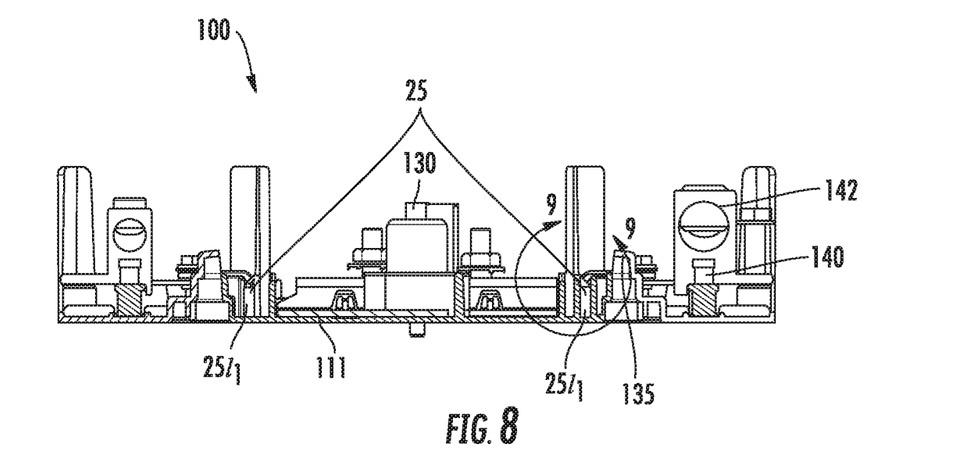
FIG. 8 is a section view of a portion of the load center taken along line 8-8 in FIG. 2B according to embodiments of the present invention.

The lateral distance D between adjacent sides of the connector 130 and the neighboring aligned first linear segment $25l_1$ of the neutral bus bar 25 can be in a range of about 1 inch to about 3.5 inches, more typically in a range of about 2.5 inches and 3 inches. This can be the same or substantially correspond to the lateral/length distance D from a leg of the clip 50li, 50lo, or a longitudinally extending centerline of the clip 50 (in an operative position with the legs parallel and extending out of the housing of the breaker) and a line side outer end 10li of the housing 10h of a short body breaker 10 (FIGS. 3B, 5 and 7).

Figures 3A, 3B:
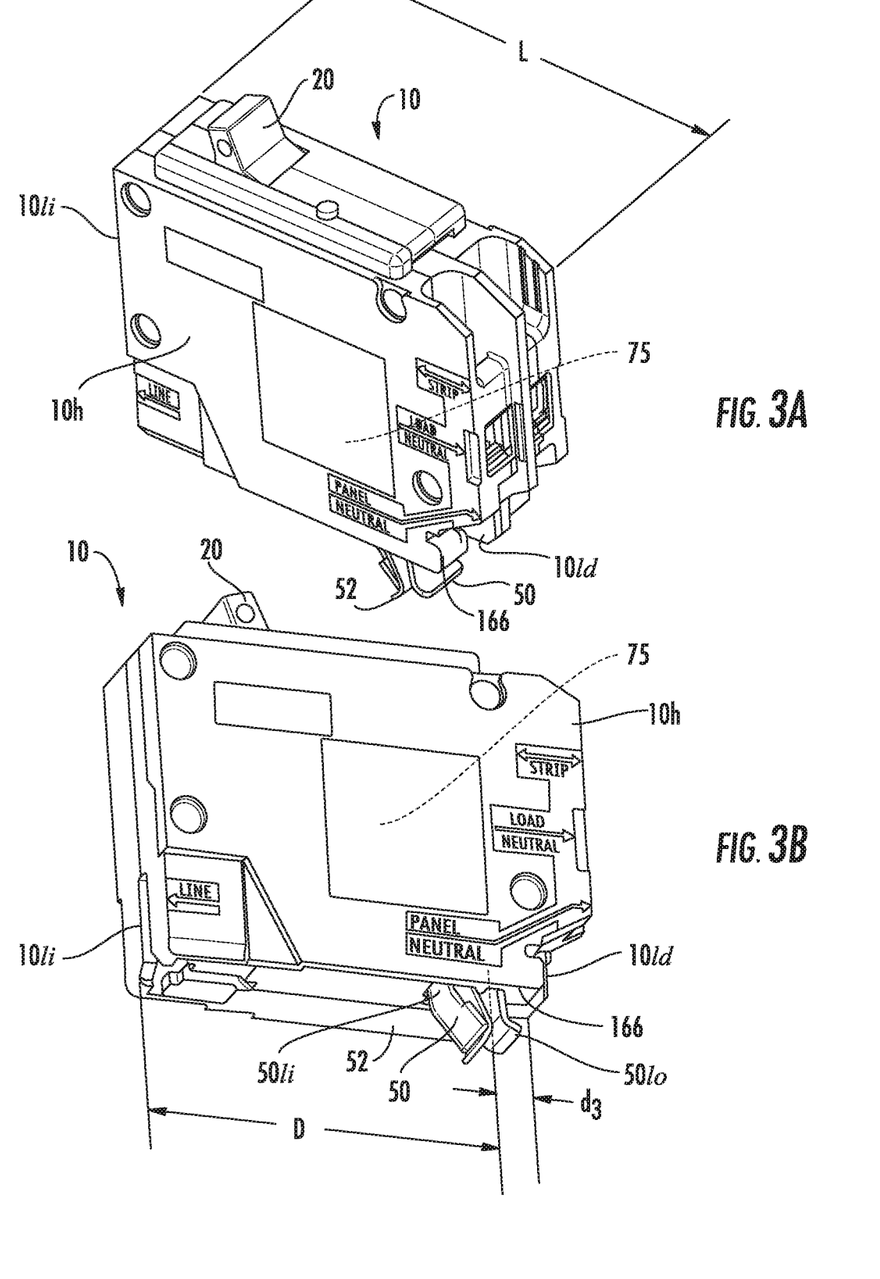
FIG. 3A is a side, top perspective view of an example circuit breaker according to embodiments of the present invention.
FIG. 3B is a rear perspective view of the example circuit breaker shown in FIG. 3A.
Figure 4:
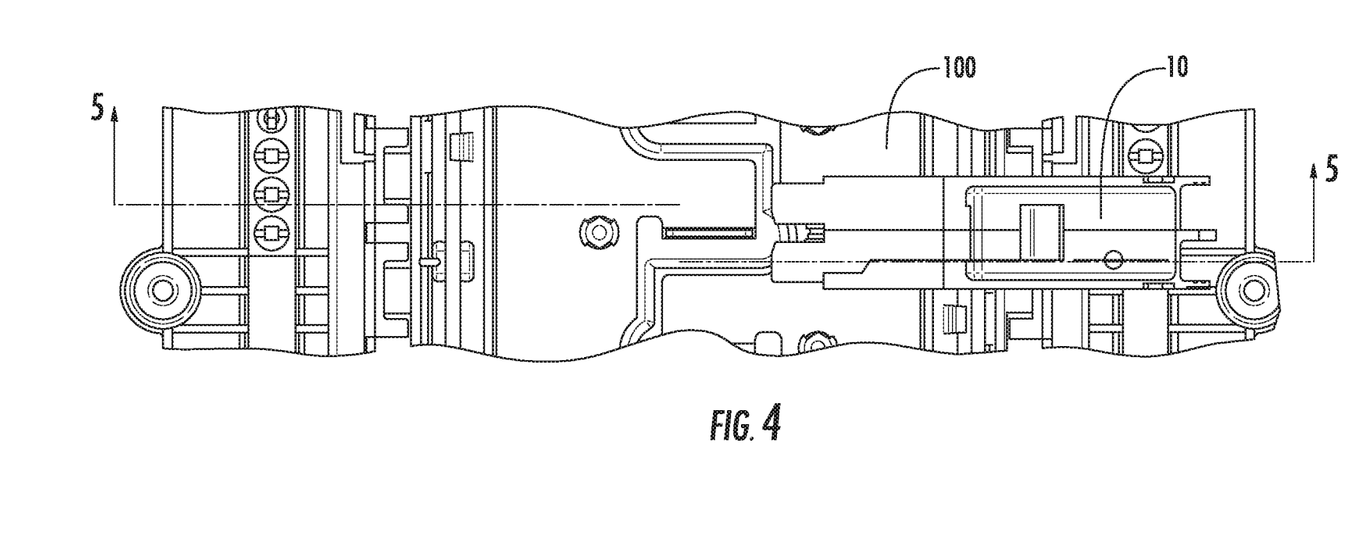
FIG. 4 is a partial view of the circuit breaker of FIG. 3A over a neutral bus bar of the load center of FIG. 2A according to embodiments of the present invention.

As shown in FIG. 3B, at least one of an inner facing leg 50li or outer facing leg 50lo of the clip 50 can reside at adjacent an outer facing load side end 10ld of the housing 10h, typically within a distance $d_3$ in a range of about 0.1 inches and 1 inch, more typically in a range between about 0.25 and 0.5 inches.

Referring again to FIGS. 2A and 2B, the load center 100 can also include a collar assembly 142 and a plurality of terminal connectors 140. The terminal connectors 140 can be longitudinally aligned and oriented parallel to the first linear segment of the neutral bus bar 25, adjacent an outer facing side of the panel 111. The first linear segment $25l_1$ of the neutral bus bar 25 can reside a lateral distance apart from the collar assembly 142 that is between 1-2 inches. The second linear segment $25l_2$ can reside laterally and longitudinally closer to the adjacent collar assembly 142. As shown in FIG. 2B, the longitudinally extending centerline (C/L) of the aperture 25a that engages the fixation member 103 can reside a distance $d_4$ away from a longitudinally extending parallel centerline (C/L) of the collar assembly and terminal connectors 140 that is in a range of 0.5-3 inches, more typically in a range of 0.75 inches and 1.5 inches.

The load center 100 can also include a projecting foot 135 that can engage an external projection 166 adjacent the clip 50 on a load side of the housing 10ld of a respective breaker 10. The breaker external projection 166 can be configured to hook a corresponding aligned foot 135 on the panel 111 and rotate to connect the breaker neutral bus 52 and clip 50 to the load center neutral bus bar 25 (FIGS. 5, 7).

Referring to FIGS. 3A, 3B and 4-7, the circuit breaker 10 includes a housing 10h, a handle or switch 20, a plug-on neutral clip 50 and a neutral bus 52. As shown, the plug-on neutral clip 50 has first and second legs 50*li*, 50*lo* that extend out of the housing 10*h*, one on each side of the neutral bus 52. The housing 10*h* can enclose a crown 50*c* of the plug-on neutral clip 50 in a manner that allows the plug-on neutral clip 50 to slidably rotate between a fully installed orientation with the neutral bus bar 25 (FIG. 7) and a pre-installed orientation (FIG. 5). Thus, the plug-on neutral clip 50 can have two extreme positions and can move from a first uninstalled position to a second installed position as the breaker housing 10*h* is rotated down onto the line stab 130 connection. The plug-on neutral clip 50 can be a spring clip.

As shown in FIGS. 5 and 7, the circuit breaker 10 includes a biasing member 70 that is coupled to the plug-on neutral clip 50 that bias the plug-on neutral clip 50 to be in a first orientation when un-installed. The biasing member 70 can resiliently bias the plug-on neutral clip 50 to a first orientation or position (FIG. 5) associated with a pre-install configuration while allowing the plug-on neutral clip 50, and breaker neutral bus 52 to rotate to a fully installed position and/or orientation when the breaker is engaged to the load center panel 111 (FIG. 7). The biasing member 70 can be provided by a coil spring 70 or other resilient members such as a leaf spring, a dome spring washer, a resilient plug or stacked dome spring washers, for example.

Referring to FIGS. 5 and 7, the breaker 10 can be installed to the panel 111 by rotating the breaker 10 into an installed position. When the breaker 10 is un-installed or removed from a load center 100, the biasing member 70 can force the neutral bus 52 and clip 50 to the first position (FIG. 5), ready for installation.

As shown in FIGS. 5 and 7, the circuit breaker 10 can enclose a printed circuit board 75 with a trip solenoid 80 and plunger 82 on one end of the solenoid and a plunger extension 85 on an opposing end facing the load side. The circuit breaker 10 can include a current transformer 90 and other circuit components of a circuit breaker circuit 10*c*.

As shown in FIG. 7, properly installed, the lower end portion of the breaker neutral bus 52 can abut the neutral bus bar 25 of the load center 100 and the inner clip leg 50*li* can abut the lower end portion of the breaker bus 52 while the other leg 50*lo* abuts an opposing side of the neutral bus bar 25.

The breaker 10 can be an AFCI or GFCI breaker, including a Type BR or CH AFCI or GFCI breaker, or dual purpose AFCI/GFCI and/or may be a molded case circuit breaker.

The load center 100 can releasably attach one or more short body branch breakers 10. The load centers 100 can be residential or industrial load centers.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A load center comprising:
a panel;
at least one collar assembly coupled to the panel;
a plurality of longitudinally spaced apart terminal screws coupled to the panel;
at least one neutral bus bar coupled to the panel;
a plurality of longitudinally spaced apart line connectors coupled to a medial portion of the panel that are laterally spaced apart from the at least one neutral bus bar; and
at least one circuit breaker with a plug-on neutral clip coupled to one of the at least one neutral bus bar,
wherein the at least one neutral bus bar has a curvilinear shape with opposing longitudinally spaced apart first and second end portions, wherein the curvilinear shape comprises a curved segment residing between first and second linear segments, wherein the first linear segment has a greater length than the second linear segment, and wherein the second linear segment resides laterally further away from the line connectors than the first linear segment.

2. The load center of claim 1, wherein the at least one circuit breaker includes at least one short body branch circuit breaker that comprises a housing with a circuit board therein, wherein the housing has a length measured between load and line sides of the housing that is between 2-4 inches, wherein at least a major length of the circuit board resides inside the housing behind and above the plug-on clip, and wherein the plug-on clip extends below and adjacent the outer load side of the housing a laterally spaced apart distance in a range of about 0.1 inches and about 1 inch.

3. The load center of claim 2, wherein the short body branch circuit breaker comprises a housing with opposing line and load sides, and wherein the load side of the housing resides inside and adjacent one of an outer right side of the panel or an outer left side of the panel.

4. The load center of claim 1, wherein the at least one neutral bus bar has a rectangular cross-sectional shape having a perimeter with a pair of long sides and a pair of short sides, wherein the long sides are oriented at a first orientation at the first linear segment of the at least one neutral bus bar and are oriented perpendicular to the first orientation at the second linear segment of the at least one neutral bus bar.

5. The load center of claim 1, wherein the first linear segment and the second linear segment each have longitudinally extending centerlines, wherein the centerlines are laterally spaced apart a distance in a range of about 0.4 inches and about 1.25 inches, and wherein the second linear segment resides at a height that is above a bottom surface of the first linear segment.

6. The load center of claim 1, wherein the at least one neutral bus bar comprises right and left side neutral bus bars, and wherein the right and left side neutral bus bars have a rectangular cross-sectional shape with an outer facing free end segment that is perpendicular to the panel and that enters the plug-on neutral clip to couple one of the at least one circuit breaker to the right or left side neutral bus bar.

7. A load center comprising:
a panel;
at least one collar assembly coupled to the panel;
a plurality of longitudinally spaced apart terminal screws coupled to the panel;
at least one neutral bus bar coupled to the panel;
a plurality of longitudinally spaced apart line connectors coupled to a medial portion of the panel that are laterally spaced apart from the at least one neutral bus bar; and
at least one circuit breaker with a plug-on neutral clip coupled to one of the at least one neutral bus bar, wherein the at least one neutral bus bar comprises right and left side neutral bus bars, and wherein the right and left side neutral bus bars have a rectangular cross-sectional shape with an outer facing free end segment that is perpendicular to the panel and that enters the plug-on neutral clip to couple one of the at least one circuit breaker to the right or left side neutral bus bar, wherein the rectangular cross-sectional shape comprises a perimeter with a pair of long sides and a pair of short sides, wherein the long sides are oriented perpendicular to the panel at a first linear segment of the at least one neutral bus bar and are oriented parallel to the panel at a longitudinally spaced apart second linear segment of the at least one neutral bus bar, and wherein the first linear segment has a greater length than the second linear segment.

8. The load center of claim 7, wherein the first and second linear segments are laterally spaced apart, have straight linear extents and are parallel to each other.

9. The load center of claim 7, wherein the plurality of terminal screws are longitudinally aligned with an adjacent one or more of the at least one of the at least one collar assembly along an outer side portion of a right and/or left side of the panel, wherein the first and second linear segments are parallel to the aligned terminal screws, and wherein the first linear segment resides closer to the line connectors than the second linear segment.

10. The load center of claim 1, further comprising a plurality of longitudinally spaced apart prongs that are coupled to the panel and that project outwardly therefrom and that hold the first linear segment of the neutral bus bar with long sides of a rectangular perimeter cross-sectional shape of the neutral bus bar projecting outward away from the panel and parallel to the prongs and with a short side extending across the long sides defining a free end segment of the neutral bus bar that faces the plug-on neutral clip of respective circuit breakers of the at least one circuit breaker.

11. A load center comprising:
a panel;
at least one collar assembly coupled to the panel;
a plurality of longitudinally spaced apart terminal screws coupled to the panel;
at least one neutral bus bar coupled to the panel;
a plurality of longitudinally spaced apart line connectors coupled to a medial portion of the panel that are laterally spaced apart from the at least one neutral bus bar; and
at least one circuit breaker with a plug-on neutral clip coupled to one of the at least one neutral bus bar,
wherein the at least one neutral bus bar comprises right side and left side neutral bus bars, wherein the right and left side neutral bus bars each have a longitudinally extending curvilinear shape with longitudinally opposing first and second end portions, wherein the first end portion of the right side neutral bus bar resides laterally and longitudinally closer to the line connectors than the second end portion of the right side neutral bus bar, and wherein the first end portion of the left side neutral bus bar resides laterally and longitudinally closer to the line connectors than the second end portion of the left side neutral bar.

12. A load center comprising:
a panel;
at least one collar assembly coupled to the panel;
a plurality of longitudinally spaced apart terminal screws coupled to the panel;
at least one neutral bus bar coupled to the panel, wherein the at least one neutral bus bar has a curvilinear shape with opposing longitudinally spaced apart first and second end portions, wherein the curvilinear shape comprises a curved segment residing between first and second linear segments, and wherein the first linear segment has a greater length than the second linear segment; and
a plurality longitudinally spaced apart of line connectors coupled to a medial portion of the panel, wherein the line connectors are laterally spaced apart from the at least one neutral bus bar, and wherein the first linear segment of the at least one neutral bus bar resides laterally closer to the line connectors than the second linear segment.

13. The load center of claim 12, wherein the first linear segment and the second linear segment each have longitudinally extending centerlines, with the second linear segment residing at a height that is above a bottom surface of the first linear segment, and wherein the centerlines are laterally spaced apart a distance in a range of about 0.4 inches and about 1.25 inches.

14. The load center of claim 12, wherein the at least one neutral bus bar comprises right and left side neutral bus bars, and wherein the right and left side neutral bus bars have a rectangular cross-sectional shape with an outer facing free end segment that is perpendicular to the panel and that enters the plug-on neutral clip to couple one of the at least one short body circuit breaker to the right or left side neutral bus bar.

15. The load center of claim 14, wherein the rectangular cross-sectional shape comprises a perimeter with a pair of long sides and a pair of short sides, wherein the long sides are oriented perpendicular to the panel at a first linear segment of the at least one neutral bus bar and are oriented parallel to the panel at a longitudinally spaced apart second linear segment of the at least one neutral bus bar, and wherein the first linear segment has a greater length than the second linear segment.

16. The load center of claim 15, wherein the first and second linear segments are laterally spaced apart, have straight linear extents and are parallel to each other.

17. The load center of claim 15, wherein the plurality of terminal screws are longitudinally aligned with and adjacent one or more of at least one of the at least one collar assembly along an outer side portion of a right and/or left side of the panel, wherein the first and second linear segments are parallel to the aligned terminal screws, and wherein the first linear segment resides closer to the line connectors than the second linear segment.

18. The load center of claim 12, further comprising a plurality of longitudinally spaced apart prongs that are coupled to the panel and that project outwardly therefrom and couple to the first linear segment of the neutral bus bar.

19. The load center of claim 12, wherein the at least one neutral bus bar comprises right side and left side neutral bus bars, wherein the first end portion of the right side neutral bus bar resides laterally and longitudinally closer to the line connectors than the second end portion of the right side neutral bus bar, and wherein the first end portion of the left side neutral bus bar resides laterally and longitudinally closer to the line connectors than the second end portion of the left side neutral bar.

20. The load center of claim 12, further comprising at least one short body circuit breaker with a plug-on clip coupled to one of the at least one neutral bus bar.

* * * * *